United States Patent [19]
Kuehling et al.

[11] Patent Number: 5,187,875
[45] Date of Patent: Feb. 23, 1993

[54] FLUSH PIN GAUGE

[75] Inventors: Guenter F. Kuehling, Berwyn, Ill.; Jeffrey L. Carmain, Aptos, Calif.

[73] Assignee: Daniels Manufacturing Corporation, Orlando, Fla.

[21] Appl. No.: 854,849

[22] Filed: Mar. 20, 1992

[51] Int. Cl.$^5$ .............................................. G01B 5/00
[52] U.S. Cl. ..................................... 33/541; 33/833; 33/836; 33/DIG. 18
[58] Field of Search ................ 33/DIG. 18, 832, 833, 33/836, 556, 501, 541, 501.05, 501.08

[56] References Cited
U.S. PATENT DOCUMENTS

| | | | |
|---|---|---|---|
| 3,100,939 | 8/1963 | Blaiklock et al. | 33/541 |
| 3,318,007 | 5/1967 | Goetz | 33/556 |
| 4,062,122 | 12/1977 | Rutter | 33/501 |

Primary Examiner—Harry N. Haroian
Attorney, Agent, or Firm—James H. Beusse

[57] ABSTRACT

A flush pin gauge for checking the position of a center pin in a coaxial connector includes a housing, a fitting on one end of the housing for attaching to a coaxial connector, and a gauge pin slidingly restrained within the housing for engaging the center pin of the coaxial connector. When the gauge is inserted over the conductor spring within the coaxial connector, the gauge pin engages the center pin and causes it to be moved and causes it to be moved longitudinally of the housing. At an opposite end of the housing, there is provided a gauging apparatus which determines from the position of an end of the gauge pin extending through the housing the depth of the pin below the top of the conductor spring. The gauging apparatus comprises a marker which has a width corresponding to the tolerance allowed for the depth of the center pin so that if the end of the gauge pin falls within the marker width, the conductor is acceptable.

8 Claims, 2 Drawing Sheets

FLUSH PIN GAUGE

The present invention relates to coaxial connectors and, more particularly, to a gauge for measuring center pin position relative to an end of a coaxial connector.

BACKGROUND OF THE INVENTION

Coaxial connectors have been used for many years for terminating and connecting coaxial cable to various apparatus. A typical coaxial connector is the BNC type shown in an exploded view in FIG. 1, in an assembled, partial cutaway view in FIG. 2, in an assembled, planar view in FIG. 3 and in an end view in FIG. 3A. The coaxial cable 10, commonly referred to as simply "coax", has an outer rubber or synthetic insulator 12 overlaying a braided coaxial shield 14. A central conductor 16 surrounded by another insulator 18 fits within the shield 14. The coax connector 20 includes a center electrical contact 22 having a cone-shaped rear portion 24 and a forward contact pin 26. The portion 24 is electrically insulated from the pin 26. When the contact 22 is coupled to cable 10, the shield 14 slips around the outside surface of cone portion 24 while conductor 16 is inserted into electrical connection with contact pin 26. The contact 22 is inserted into outer housing 28 and threaded ferrule 30 is screwed into the housing. A floating ferrule 32 within ferrule 30 crimps the cable 10 into fixed engagement with contact 22 upon tightening of ferrule 30 into housing 28.

When assembled properly, the contact pin 26 extends through an outer conductor spring 34 such that an end of contact pin 26 is generally coextensive with an end 36 of conductor spring 34. The conductor spring 34 encloses an insulator 38 which is coaxial with and spaced from pin 26. An outer end of insulator 38 terminates generally coextensively with conductor spring 34. The spring 34 electrically connects to shield 14 on cable 10.

Various regulations and standards apply to connector 20 including regulations and standards designed to set impedance and noise generation and introduction. Improper assembly of connector 20 can result in signal degradation and introduction of electrical noise. One area that is known to affect electrical characteristics of such coax connectors is the depth of the end of pin 26 with respect to the outer end 36 of conductor spring 34. In particular, it is generally desirable that the tip of pin 26 be about 0.030 inches below the outer end of the conductor spring 34. An exemplary specification for such distance, indicated at A in FIG. 3, is 0.030±0.019 inches. In the past, small gauges, such as gauge 40 in FIG. 4, have been used to confirm proper depth of pin 26. However, such gauges are difficult to use accurately and require "feel" as well as visual acuity to check pin depth. Accordingly, it is desirable to provide an improved apparatus for accurately measuring pin depth on coax connectors.

SUMMARY OF THE INVENTION

The above and other desirable features are attained in a flush pin gauge for checking the position of a center pin in a coaxial connector in which the gauge includes a housing, a fitting attached to one end of the housing for slidingly engaging the conductive spring within a coaxial connector. A gauge pin is slidingly restrained within the housing and has one end which extends generally centrally of the fitting and terminates adjacent an outer end of the fitting. Another end of the gauge pin extends through the housing and terminates at a generally opposite end of the housing. Gauging means is coupled to the opposite end of the housing for determining the relative position of the gauge pin. When the flush pin gauge is pressed onto a coaxial connector, the center pin of the connector presses against the gauge pin causing it to be moved laterally of the housing a distance which is inversely proportional to the depth of the pin below the top end of the conductor spring. The opposite end of the gauge pin can be visually observed against the gauging means to determine if the gauge pin is moved a preselected distance. The preselected distance in which the gauge pin moves is selected to correspond to the desired depth of the top or tip end of the contact pin below the outer end of the conductor spring. In the illustrative embodiment, the gauging means comprises an extension of the housing having a marker which coincides with the end of the gauge pin when the contact pin is at a proper depth. The width of the marker is adjusted to account for tolerances about the optimal depth of the contact pin. The gauge pin is spring loaded within the housing so as to be pressed towards the contact pin to thereby maintain contact with the contact pin as the housing is inserted onto the connector. The flush pin gauge may be calibrated by positioning of the gauging marker. The gauging pin may be positioned within the housing by machining of a shoulder on the pin which mates with a surface inside the housing to control the positioning of the end of the gauging pin coextensive with the end of the fitting.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 5:
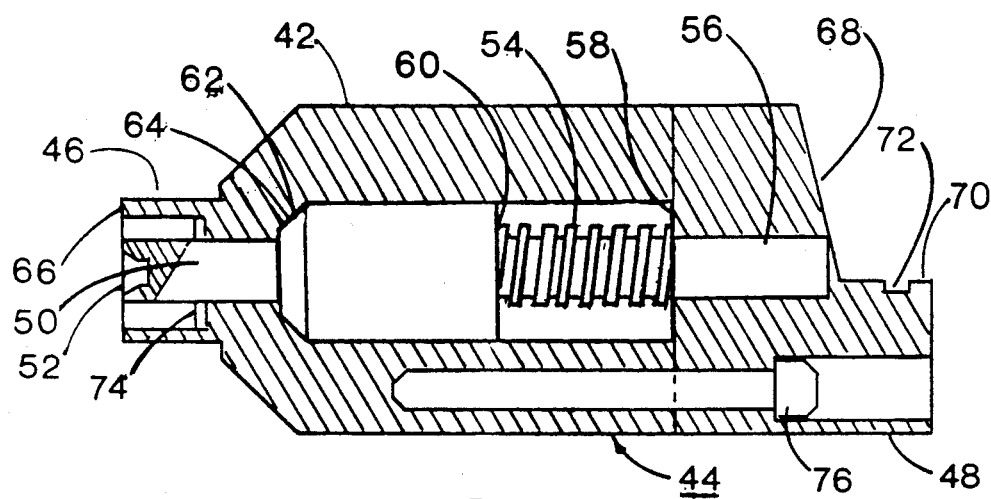
FIG. 5 is a planar view of a flush pin gauge in accordance with the present invention.

Referring now to FIG. 5, there is shown a cross-sectional view of a flush pin gauge 44 in accordance with one form of the present invention. The gauge 44 includes an outer housing 42 having a fitting 46 on one end thereof and a gauging means 48 on an opposite end. The housing 42 is designed to contain a gauge pin 50 which has one end 52 extending generally coextensively with the fitting 46. For purposes of illustration, the fitting 46 is shown in cross-section but will be understood to be a generally coaxial fitting surrounding the end 52 of gauge pin 50. The gauge pin 50 is shown extending through the housing 42 and terminating adjacent the gauging means 48. The gauge pin 50 is urged towards the fitting 46 by a coil spring 54 surrounding an aft portion 56 of the gauge pin 50. The spring 54 reacts between a shoulder 58 on an inside surface of gauging means 48 and one end of a shoulder 60 formed on gauge pin 50. An opposite end of shoulder 60 indicated at 62 abuts against another shoulder 64 formed within housing 42. It will be appreciated that the abutment of shoulder 62 against shoulder 64 controls the positioning of the end 52 of gauge pin 50. Accordingly, by machining or adjusting the position of shoulder end 62, the relative position of end 52 with regard to the outer end 66 of fitting 46 can be adjusted.

The aft portion 56 of gauge pin 50 terminates in a surface 68 which is machined or dimensioned with regard to end 52 such that the surface 68 falls within a predetermined position on gauge means 48 when gauge pin 50 is operatively connected to a connector so as to measure the depth of contact pin 26. In the illustrative embodiment, the gauge means 48 is an extension of the housing 42 and has a flat upper surface 70 on which a slot 72 is machined. The slot 72 serves as a marker for determining the position of the end 68 of gauge pin 50. The width of the slot in the direction of motion of gauge pin 50 is designed to be within the tolerances specified for the particular connector with which the gauge is to be used. In the illustrative embodiment wherein the tolerance is ±0.019 inches, the width of the slot 72 would be 0.038 inches. Accordingly, if the contact pin 26 within a connector being tested were located at the optimal position, the end 68 of gauge pin 50 would fall within the center of the slot 72.

Figure 1:
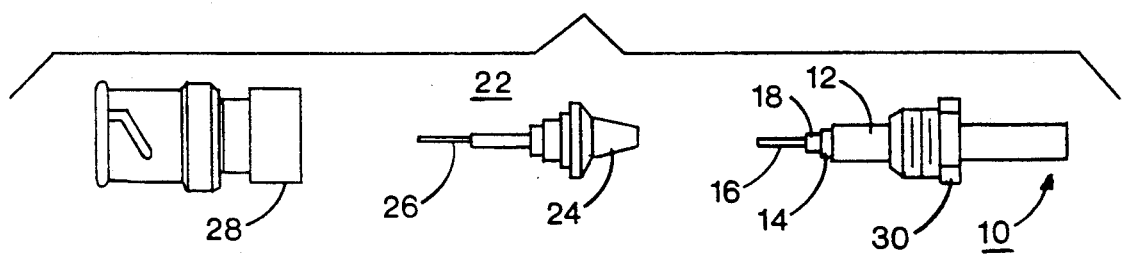
FIG. 1 is an exploded view of a typical coaxial connector.
Figure 2:
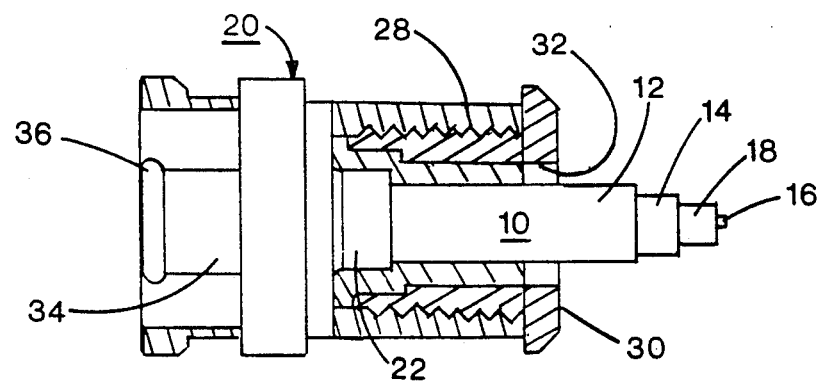
FIG. 2 is an assembled partial cutaway view of the coaxial connector of FIG. 1.
Figure 3A:
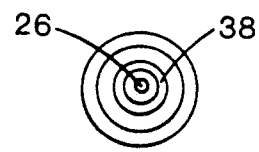
FIG. 3A is an end view of a coaxial connector taken along line 3A—3A of FIG. 3.
Figure 3:
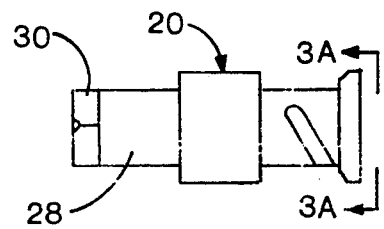
FIG. 3 is a planar view of the connector of FIG. 1.
Figure 4:
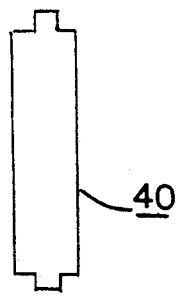
FIG. 4 is an illustration of a prior art depth gauge for the connector of FIG. 1.
Figure 6:
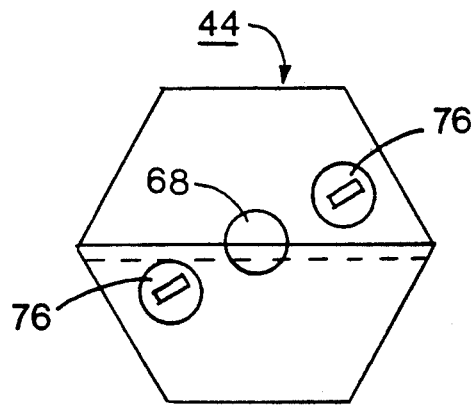
FIG. 6 is an end view of the flush pin gauge of FIG. 5.

Referring to FIG. 6, there is shown an end view of the flush pin gauge 44 illustrating that the housing 42 is preferably formed with a hex shape to prevent the gauge from rolling when placed on a work bench. Also illustrated in this FIG. 6 are machine screws 76 which are utilized to couple the aft end of housing 42 to the forward end of gauging means 48. The housing is split in an axis normal to its lengthwise axis to permit assembly of the gauge pin and spring within the housing.

Figure 7:
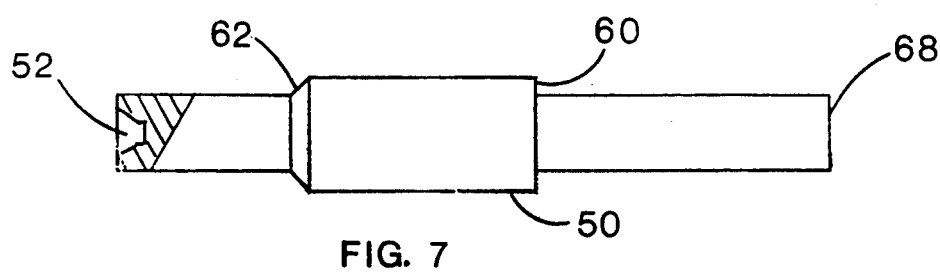
FIG. 7 is a planar view of the gauge pin utilized in the gauge of FIG. 5.

Referring to FIG. 7, there is shown a planar view of the gauge pin 50 illustrating the shoulder 62 which has a forward surface machined to establish a predetermined dimension between the shoulder 62 and the end 52 of the gauge pin 50. It is also noted that the end of the gauge pin 52 includes a countersunk portion designed to fit over the contact pin 26 to center pin 26 and prevent any deflection or damage of pin 26 and facilitate proper use of the flush pin gauge.

In operation, the flush pin gauge is pressed onto the end of a connector 20 so that the fitting 46 surrounds the conductor spring 34 allowing the gauge pin 50 to engage an end of the contact pin 26. The gauge is pressed onto the connector until the inner surface 74 of the fitting 46 engages or abuts against the outer end of the contact spring 34. At this point, the position of the end 68 of the gauge pin 50 is noted on gauge means 48. If the end 68 falls within the marker 72, then the depth of the contact pin 26 below the end of the conductor spring 34 is acceptable. If the end 68 does not fall within the marker 72, the connector is unacceptable and must be discarded. It should be noted that the inner portion of the fitting 46 is preferably machined with a slight internal taper so that the diameter of the opening is smaller at the lower end than it is at the outer end. This causes the connector spring 34 to be depressed or crimped as the flush pin gauge is inserted and allows the gauge to be held in place on the connector without being forced while the position of the end 68 of the gauge pin is being read.

While the invention has been described in what is presently considered to be a preferred embodiment, other modifications and variations will become apparent to those skilled in the art. It is intended therefore that the invention not be limited to the present embodiment but be interpreted within the full spirit and scope of the appended claims.

What is claimed is:

1. A flush pin gauge for checking the position of a center pin in a coaxial connector, the connector having an insulator spaced from and encircling the center pin and a conductive outer shield circumscribing the insulator, the gauge comprising:

a housing;

a fitting attached to one end of the housing, the fitting being adapted for slidingly engaging the conductive outer shield of the connector;

a gauge pin slidingly restrained in the housing, one end of the gauge pin extending generally centrally of the fitting and terminating adjacent an outer end of the fitting, another end of the gauge pin extending from another end of the housing generally opposite the one end; and gauging means coupled to the another end of the housing adjacent the another end of the gauge pin for determining the relative position of the another end of the gauge pin, the gauge pin being slidingly pushed through the housing when the fitting is pressed into an operative measuring position on the outer shield of the connector, the position of the center pin with respect to an outer end of the outer shield being indicated by the position of the another end of the gauge pin with respect to the gauging means, the gauging means comprising means extending from the another end of the housing and aligned with the gauge pin, the extending means having a marker of preselected width extending transverse to a direction of sliding motion of the gauge pin, the marker being positioned to align with the another end of the gauge pin when the gauge is operatively coupled to a coaxial connector having a properly positioned center pin.

2. The gauge of claim 1 and including spring means operatively coupled to the gauge pin for urging the gauge pin toward the fitting.

3. The gauge of claim 1 and including an enlarged diameter shoulder formed on the gauge pin and a mating surface formed in the housing, contact between the shoulder and the mating surface defining the extension of the one end of the gauge pin into the fitting.

4. The gauge of claim 1 and including a shoulder formed in the fitting for engaging an outer end of the outer shield of the connector for establishing a reference point for measuring center pin position.

5. The gauge of claim 1 wherein the preselected width of the marker corresponds to an allowable tolerance of the position of the center pin with respect to an end of the conductive outer shield.

6. The gauge of claim 5 wherein the marker comprises a slot extending across said housing transverse to a direction of motion of said gauge pin.

7. A flush pin gauge for checking the position of a center pin in a coaxial connector, the connector having an insulator spaced from and encircling the center pin and a conductive outer shield circumscribing the insulator, the gauge comprising:

a housing;

a fitting attached to one end of the housing, the fitting being adapted for slidingly engaging the conductive outer shield of the connector;

a gauge pin slidingly restrained in the housing, one end of the gauge pin extending generally centrally of the fitting and terminating adjacent an outer end of the fitting, another end of the gauge pin extending from another end of the housing generally opposite the one end, said one end including a countersunk portion fitting over the center pin for preventing transverse deflection of the center pin when the gauge is in an operative position on the connector; and gauging means coupled to the another end of the housing adjacent the another end of the gauge pin for determining the relative position of the another end of the gauge pin, the gauge pin being slidingly pushed through the housing when the fitting is pressed into an operative measuring position on the outer shield of the connector, the position of the center pin with respect to an outer end of the outer shield being indicated by the position of the another end of the gauge pin with respect to the gauging means.

8. The gauge of claim 7 wherein said fitting includes an internal taper for compressing the conductive outer shield when said gauge is operatively positioned on the connector for holding said gauge in said operative position during checking of the center pin position.

* * * * *